US008657097B2

(12) United States Patent
Vallee

(10) Patent No.: US 8,657,097 B2
(45) Date of Patent: Feb. 25, 2014

(54) SQUARING-UP DEVICE FOR A PACKAGE CONVERTING LINE

(75) Inventor: Philippe Vallee, St Martin du Fouilloux (FR)

(73) Assignee: Rapidex S.M. (FR)

( * ) Notice: Subject to any disclaimer, the term of this patent is extended or adjusted under 35 U.S.C. 154(b) by 411 days.

(21) Appl. No.: 12/611,238

(22) Filed: Nov. 3, 2009

(65) Prior Publication Data

US 2010/0108471 A1 May 6, 2010

(30) Foreign Application Priority Data

Nov. 3, 2008 (FR) ...................................... 08 06117

(51) Int. Cl.
*B65G 15/64* (2006.01)

(52) U.S. Cl.
USPC ................ 198/345.1; 198/377.06; 198/377.1; 198/732

(58) Field of Classification Search
USPC .............. 198/377.1, 377.06, 732, 345.1, 416, 198/726, 378
See application file for complete search history.

(56) References Cited

U.S. PATENT DOCUMENTS

| | | | | |
|---|---|---|---|---|
| 1,232,051 | A * | 7/1917 | Kuhn | 198/729 |
| 1,877,931 | A * | 9/1932 | Metcalf | 198/729 |
| 1,968,415 | A * | 7/1934 | Metcalf | 198/644 |
| 2,623,746 | A * | 12/1952 | Gegenheimer et al. | 271/271 |
| 2,769,528 | A * | 11/1956 | Goodrich et al. | 198/718 |
| 3,095,639 | A * | 7/1963 | Seien | 29/709 |
| 3,252,560 | A * | 5/1966 | Chamberlin | 198/409 |
| 3,355,856 | A * | 12/1967 | Randrup | 198/382 |
| 3,789,766 | A * | 2/1974 | Hurwitz | 104/172.3 |
| 3,929,220 | A * | 12/1975 | Powel | 198/732 |
| 4,004,680 | A * | 1/1977 | Warmann | 198/732 |
| 4,353,276 | A * | 10/1982 | Ackerfeldt | 83/708 |
| 4,483,526 | A * | 11/1984 | Bulka et al. | 198/377.07 |
| 4,864,936 | A * | 9/1989 | Rietsch, Jr. | 104/172.1 |
| 5,042,636 | A * | 8/1991 | Underwood | 198/890 |
| 5,125,501 | A * | 6/1992 | Dojan | 198/732 |
| 5,350,055 | A * | 9/1994 | Lecrone | 198/718 |
| 5,501,318 | A * | 3/1996 | Disrud | 198/732 |
| 5,711,412 | A * | 1/1998 | Gysin et al. | 198/732 |
| 5,937,999 | A * | 8/1999 | Spatafora | 198/728 |
| 5,964,461 | A * | 10/1999 | Ende et al. | 271/271 |
| 6,260,690 | B1 * | 7/2001 | Batzer | 198/626.5 |
| 6,378,693 | B1 * | 4/2002 | Ballestrazzi et al. | 198/732 |
| 6,422,153 | B1 * | 7/2002 | Reitsch, Jr. | 104/172.3 |
| 6,662,933 | B2 * | 12/2003 | De Guglielmo et al. | 198/732 |
| 7,537,105 | B2 * | 5/2009 | Fourney | 198/732 |
| 2006/0118390 | A1 | 6/2006 | Connelly et al. | |

FOREIGN PATENT DOCUMENTS

| | | | |
|---|---|---|---|
| EP | 0385579 | | 9/1990 |
| FR | 2721301 | | 12/1995 |
| WO | WO 00/02721 | A | 1/2000 |

OTHER PUBLICATIONS

French Search Report dated Jun. 22, 2009, issued in corresponding French priority application No. FR 0806117.

* cited by examiner

*Primary Examiner* — Joseph Dillon, Jr.
(74) *Attorney, Agent, or Firm* — Ostrolenk Faber LLP

(57) ABSTRACT

A squaring-up device for a package converting line, located between a blank folding section and a folded-blank assembly section. The device has a frame, at least one jogger, having a deployed active position for correcting a geometry of a folded blank, and a drive for transporting the jogger. The squaring-up device includes an effector for moving the jogger from the active position to a retracted inactive position, and vice versa, and control the effector.

13 Claims, 2 Drawing Sheets

SQUARING-UP DEVICE FOR A PACKAGE CONVERTING LINE

BACKGROUND OF THE INVENTION

The present invention relates to a squaring-up device intended for a package converting line. The squaring-up device is more particularly mounted in a package-making machine, of the converting line type. The invention also relates to a converting line or any other package-making machines incorporating a device designed for squaring up package blanks.

In the packaging industry, a converting line is a machine often used to make up boxboard cartons or boxes, and more especially corrugated board boxes. In the converting line, blanks for boxboard cartons are introduced to be automatically folded and assembled. The converting line is defined by way of non-exhaustive example as a folder-gluer, a folder-stapler, or other folders. The folded blank is thus kept assembled by means of glue, a series of staples, or an adhesive plastic tape, or other means.

Traditionally, the converting line comprises, proceeding in the downstream direction, a series of sections in the form of modules or stations which may vary in number depending on the complexity of the operations required by the type of carton to be produced. The converting line runs continuously, meaning that the blanks passing through it are processed while continuing to advance. The conveying of the blanks from one section to the next is done by means of conveyor belts.

First of all, a feeder sends the blanks one after the other from a stack. In a folding section, the panels of the blank are folded the one over the other by belts prior to their final assembly. An assembly section assembles the folded panels which overlap in one or more areas, to form the folded carton. At the outlet, a delivery receives and stacks the folded, flattened and assembled cartons.

In the folding section, friction can produce folding errors, in which one or more folded panels are misaligned with respect to one or more other panels, whether folded or not folded. These misalignments or gaps are noticeable because the edges of the panels are not accurately aligned with each other. For example, the left and right flaps are not properly aligned with the body of the sheet.

This causes the final carton to have a poor geometry. Such misalignments can cause jams in the assembly section, which follows the folding section. The carton will have a poor external appearance. The carton will not cope with transportation conditions and will gradually deteriorate until it breaks. The product inside such a carton will then deteriorate.

Many methods have been developed to correct these folding errors. These methods allow the folded panels to be repositioned correctly with respect to each other or with respect to the unfolded panels, and allow the alignment to be adjusted after folding.

To correct folding errors, an additional device or section for squaring up the blanks is provided between the folding section and the assembly section of a package converting line. Squaring up is done by knocking, striking or jogging the edge of the folded panel or panels of the blank to realign them the unfolded panel or panels.

PRIOR ART

A squaring-up device comprises a frame and one or more joggers which push the blank by striking it. The joggers project perpendicular to the plane of advance of the blanks. The front knocking face of each jogger is perpendicular to the direction of longitudinal advance of the blanks. The joggers project sideways cantilever-fashion from drive means in the form of a chain. These joggers are fixed and mounted on the drive means.

The joggers and the drive means experience large mechanical stresses causing wear to their front part and/or to their attachment part to the drive means. Being mounted cantilever-fashion, the joggers transmit twisting forces to the drive means. Every time a blank passes, the joggers, the drive means and the guide means for the drive means suffer premature wear. Jogger replacement requires machine stops.

Another effect of the cantilever mounting is that the joggers and the drive means vibrate, which makes the device noisy. In an attempt to limit both the wear and the noise, the speed of advance of the blanks must be kept down, reducing the productivity of the converting line.

The joggers are unable to move when the squaring-up device becomes jammed with boxboard blanks. When a jam occurs the joggers and the drive means receive the impacts of the blank still on its path directly. There is no protection for the joggers and drive means. The joggers continue to push or strike the blank although it has stopped. This causes the joggers to rotate horizontally due to their cantilever mounting. The joggers become damaged and have to be replaced.

What is more, when the jam occurs the joggers tear, perforate or destroy the blanks, causing a vertical twisting of the drive means which further accentuates the wear phenomena. Each jam automatically triggers a machine stoppage.

Last of all, if the inserted blanks are much longer than the blanks traditionally used, for example twice their length, or their length is much greater than their width and they are laid parallel to the longitudinal axis of the converting line, the joggers cannot be used and even become obstacles. This mode of use of the converting line with longer blanks is known as "skip feed".

There is then no alternative but to remove and reposition the joggers, to keep the function of squaring up the folded blanks. To adapt the squaring-up device to the length of the blanks, one or more of the joggers are removed and then repositioned. The operator has to get into the machine to manually remove the jogger or joggers.

Converting to skip-feed mode requires stopping the machine and often introduces errors when selecting which joggers require removal and which require refitting. Removing the jogger or joggers is a manual task, and there are often mistakes when refitting them. Then, too, people often forget to refit the joggers.

Document FR-2,721,301 discloses a folder for boxboard sheets. The folder has drive devices for moving a boxboard sheet from the entrance to the stapling/gluing station. The drive devices include two chain devices upstream and two chain devices downstream. One function of these chain drive devices is to square up the boxboard sheet between the entrance and the stapling/gluing station so that the sides of the left and right flaps when folded onto the sides of the body of the boxboard sheet are aligned as accurately as possible.

Each chain device includes joggers, upstream joggers or pushers on the upstream chains, with a vertical face oriented downstream, and downstream joggers or stacking joggers on the downstream chains, having a vertical face oriented upstream. The boxboard sheet, pushed by the two pusher joggers, comes against the two stacking joggers and is thus trapped between their vertical faces. The right and left flaps folded onto the body of the boxboard sheet are thus aligned with the body of the sheet, which is presented to the stapling/gluing station perfectly straight.

However, the problem with this folder is that jams automatically stop it and cause repeated wear and sometimes breakages of the chains. Moreover, with such a system of joggers mounted nondetachably on the chains, the only way to engage skip-feed mode is to completely change the chain drive devices.

Document EP-0,385,579 discloses an apparatus for squaring up folded box blanks. The apparatus can be incorporated in a conventional folding/gluing machine. It has transport means for transporting the box blanks which are slotted at the end of folding. A so-called calibrating plate is inserted in a slot between overlapping panels of a box blank, before completion of the folding of the blank, so as to align or to square up the folded blank. Insertion means move a carrier with the calibrating plate in synchronization with the transport means and also extract this plate from the slot.

The problem with that kind of apparatus is that it is suitable for only one specific type of blank, where there is a slit or slot for the calibrating plate to be inserted into. Moreover, with such carriers and calibrating plates mounted nondetachably on the insertion means, there is no easy way of engaging skip-feed mode without completely stopping the folder-gluer.

SUMMARY OF THE INVENTION

A major object addressed with the invention is to develop a device capable of squaring up blanks in a converting line. A second object is to provide a squaring-up device that comes after the folding process and before the panels of the blank are assembled. A third object is to devise a device provided with one or more joggers worked by drive means synchronously with the conveying movement of the blanks. A fourth object is to provide a device that does not require manual removal of one or more joggers, either when the blanks become jammed inside the converting line, or when switching from normal mode to skip-feed mode and back again. A fifth object is how to use a squaring-up device that does not have the disadvantages of the prior art. Still another object is to provide a converting line equipped with a squaring-up device that is usable regardless of the method of assembly of the panels of the blanks.

The invention therefore relates to a squaring-up device intended for a package converting line, and located between a blank folding section and a folded-blank assembly section. The squaring-up device has:

- a frame,
- at least one jogger, having a deployed active position for correcting a geometry of a folded blank, and
- drive means for transporting the jogger.

In accordance with one aspect of the present invention, the squaring-up device comprises:

- effector means for moving this jogger from the active position to a retracted inactive position, and vice versa from the retracted inactive position to this deployed active position, and
- control means for the effector means.

In other words, one or more joggers in the squaring-up device have two functioning positions. The first position is the conventional mode in which the jogger is active and performs its squaring-up function. The second position of the jogger, which is helpful to the operator of the converting line and of the device, is a retracted position in which the jogger is intentionally moved out of the way to avoid impacts. The jogger or joggers move from a deployed mode to a retracted mode and from the retracted mode to the deployed mode automatically without the need for manual intervention by an operator inside the machine.

With the invention, as soon as a jam occurs, the joggers automatically retract. As a result, neither the blanks nor the joggers are damaged. With the invention, as soon as the blanks require conversion to skip-feed mode, the relevant jogger or joggers are automatically retracted. The operator selects skip-feed mode and the unwanted jogger or joggers are withdrawn.

In another aspect of the present invention, a converting line comprises a squaring-up device with one or more of the technical features presented below and claimed.

BRIEF DESCRIPTION OF THE DRAWINGS

A clearer understanding of the invention and of its various advantages and features will be gained from the following description, of the non-restrictive illustrative embodiment, with reference to the attached schematic drawings, in which.

DETAILED DESCRIPTION OF PREFERRED EMBODIMENTS

In a converting line, such as a folder-stapler, boxboard blanks (not shown) travel from a folding section, in which one or more of their constituent panels are folded, to an assembly section, in which their folded panels are stapled. The blanks, which are laid flat before, during and after folding, move forward in a plane of advance from an upstream position to a downstream position, which is left to right when viewed from the operator's side, in a direction (F) of longitudinal advance.

Figure 1:
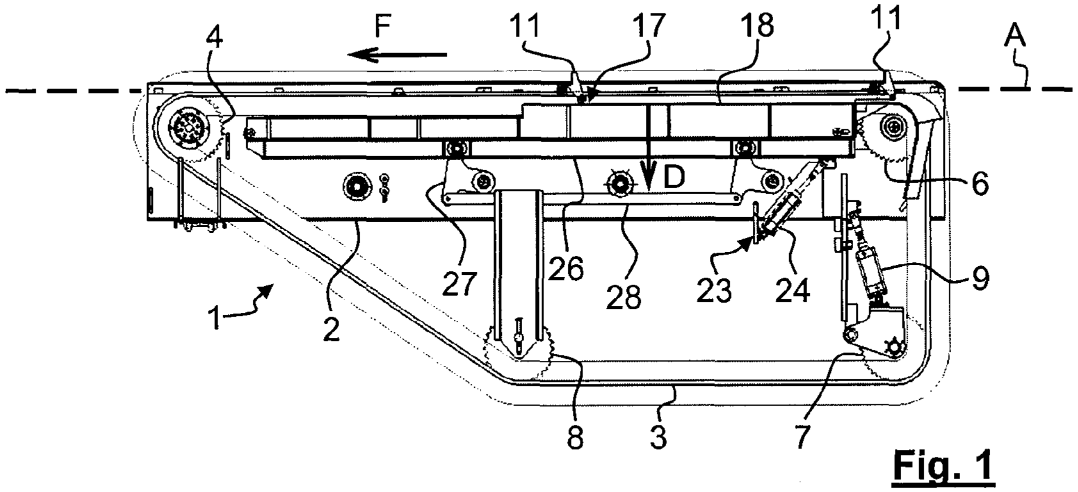
FIG. 1 is a side view of a device according to the invention, with the joggers deployed.
Figure 2:
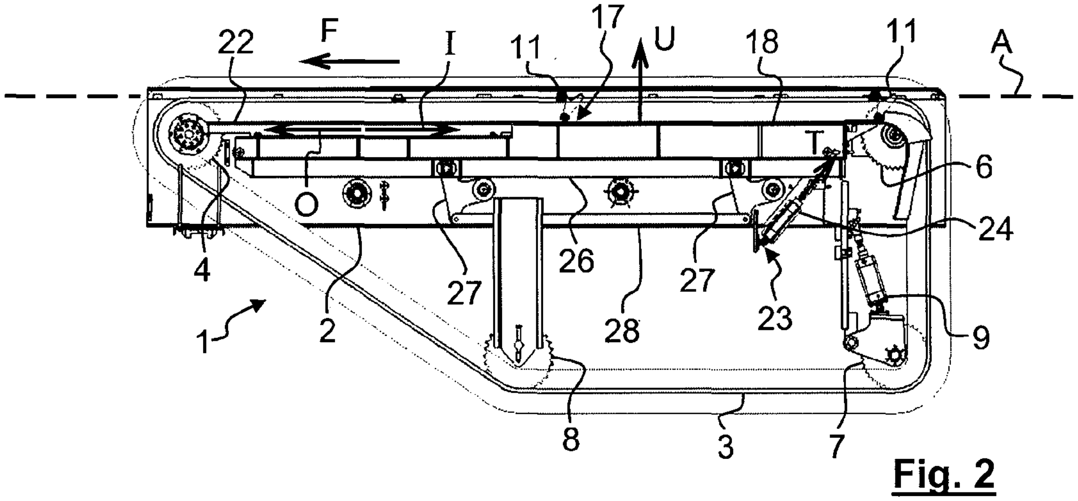
FIG. 2 is a side view of the device seen in FIG. 1, with the joggers retracted and an extended-length slide for extended-length blanks.
Figure 3:
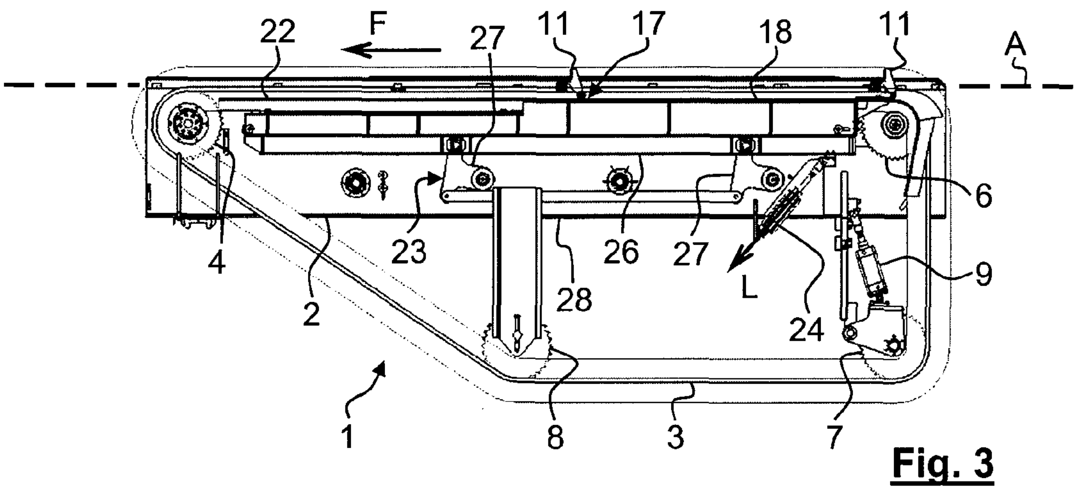
FIG. 3 is a side view of the device seen in FIG. 1, with the joggers deployed and an extended-length slide for extended-length blanks.

A squaring-up device (1) for squaring up the blanks, whose panels are almost or fully folded, is set up between the folding section and the assembly section. As FIGS. 1-3 show, the squaring-up device (1) comprises firstly a frame (2), which may be a steel plate, on which all the component parts are mounted. The long dimension of the frame (2) is parallel to the direction (F) of longitudinal advance of the blanks. The frame (2) defines a plane approximately perpendicular to the plane of advance of the blanks.

The squaring-up device (1) comprises drive means, which may be a chain (3). Other drive means, such as a belt, may also be considered. The chain (3) makes a closed loop passing around four sprockets (4, 6, 7 and 8) laid out in a two-dimensional quadrilateral. The sprockets (4, 6, 7 and 8) rotate relative to the frame (2). The plane in which the chain (3) is inscribed is essentially parallel to the plane of the frame (2). As the blanks advance from right to left in their direction (F) of longitudinal advance, seen from the operator's side, the chain (3) rotates counterclockwise.

The chain (3) is kept essentially horizontal between two of the sprockets (4 and 6) and is essentially horizontal towards the top of the frame (2). As a result, the drive means with the chain (3) possess a longitudinal axis (A) essentially parallel to the direction (F) of longitudinal advance of the blanks. Chain tension is preferably adjustable, in the present case, by a system incorporating a tensioner worked by a jack (9) which moves one of the sprockets (7).

Figure 4:
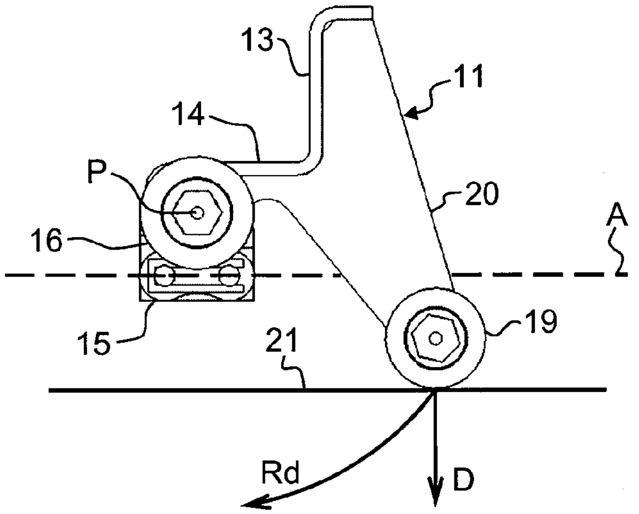
FIG. 4 is a side view of a jogger in the deployed position, mounted on its drive means.

The squaring-up device (1) comprises one or more joggers (11). Each jogger (11) has a striking face (13). When the jogger (11) is in the so-called active position (see FIGS. 1, 2 and 4), the striking face (13) is facing downstream and is essentially vertical. The striking face (13) is thus essentially perpendicular to the plane of advance of the blanks and approximately perpendicular to the plane in which the chain (3) is inscribed. This allows squaring-up to take place.

The jogger (11) is mounted on the chain (3), via a core (14), which is parallel to the plane defined by the links (15) of the chain (3). The core (14) is also perpendicular to the striking face (13) when the jogger (11) is in the active position. When the chain (3) moves, it carries the jogger (11) with it. The jogger (11) thus follows the same path as the chain (3), most importantly along the longitudinal axis (A), when it is at the top of the frame (2), making squaring-up possible.

The jogger (11) is advantageously mounted centrally relative to the chain (3). It is preferable for the central longitudinal plane of this jogger (11), passing vertically through the middle of the striking face (13), to coincide essentially with the longitudinal axis (A) of this chain (3).

To promote smooth progress, the jogger (11) preferably comprises two lateral stabilizer rollers (16). The two lateral rollers (16) are attached to either side of the core (14). The two lateral rollers (16) roll in a horizontal trough (not visible in the Figures) which is mounted on the frame (2).

Figure 5:
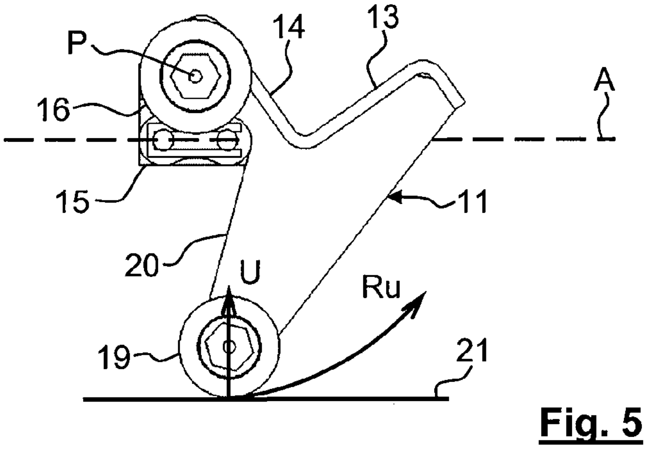
FIG. 5 is a side view of a jogger in the retracted position, mounted on its drive means.

In the invention, the jogger (11) has two positions, the active position (see FIG. 4) and a so-called inactive position (see FIG. 5). The jogger (11) moves from the deployed active position to the retracted inactive position, and vice versa from the retracted inactive position to the deployed active position. When the jogger (11) is in the retracted inactive position, blanks pass over it without touching it.

For this purpose, and advantageously, each jogger (11) is on a pivot axis (P) allowing it to be rotated (arrows Rd and Ru in FIGS. 4 and 5) from the active position to the inactive, and back again from the inactive position to the active. The pivot axis (P) advantageously lies between the jogger (11) and the chain (3). The pivot axis (P) is essentially horizontal and runs through the core (14). The pivot axis (P) is preferably essentially perpendicular to the direction (F) of longitudinal advance of the blanks or to the longitudinal axis (A) of the chain (3), in which case the pivot axis (P) lies in a plane coinciding with or essentially parallel to the plane of advance of these blanks. The pivot axis (P) is perpendicular to the central longitudinal plane of the jogger (11). The pivot axis (P) passes through the axis of rotation of the two lateral stabilizer rollers (16).

When the jogger (11) pivots (Rd), it tilts upstream, that is in the clockwise direction. Its striking face (13) moves from an essentially vertical position perpendicular to the plane of advance of the blanks and essentially perpendicular to the plane in which the chain (3) is inscribed (see FIGS. 1, 3 and 4), to a position in which it is inclined upstream (see FIGS. 2 and 5). By way of example, the pivoting may be of around 45°. The jogger is advantageously provided with return means (not visible) to return it automatically from the deployed active position to the retracted inactive position.

In order to pivot the jogger (11), the squaring-up device (1) comprises effector means (17) to move the jogger (11) from the active position to a retracted inactive position and vice versa from the inactive position to an active position.

The effector means (17) preferably comprise a slide (18), acting as a rail, which may be mounted on the frame (2). The slide (18) is advantageously movable (arrows U and D in FIGS. 1, 3, 4 and 5), in the vertical direction, between an advanced position, which in this example is up, and a withdrawn position, which in this example is down, and vice versa between the withdrawn position and the advanced position.

In this illustrative embodiment, the slide (18) is a longitudinal ramp. This ramp is advantageously parallel to the longitudinal axis (A) of the chain (3), and to the direction (F) of longitudinal advance of both the blanks and the jogger (11).

The effector means (17) also include a slider (19). The slider (19) is connected to the jogger (11) and can interact with the slide (18) in a way similar to a carriage. The slider (19) is preferably a rotating wheel which can rest on and roll or slide without friction on the slide (18). The wheel (19) is positioned on the end of an leg (20) projecting from the striking face (13) and from the core (14). As the chain (3) moves the jogger (11), the wheel (19) travels all the way along the length of the upper surface (21) of the slide (18).

The engagement of the wheel (19) with the slide (18) thus makes it possible to move the jogger (11) from the active position, when the slide (18) is advanced, to the inactive position, when the slide (18) is withdrawn, and vice versa from the inactive position, when the slide (18) is withdrawn, to the active position, when the slide (18) is advanced.

In other words, when the slide (18) rises (U) and reaches it top position (FIGS. 1, 3 and 4), the jogger (11) rotates upwards (Ru) to the active position and the jogger (11) is thus able to square up the folded blanks with its striking face (13) vertical. Then, when the slide (18) is lowered (D) to its bottom position (FIGS. 2 and 5), the jogger (11) rotates down (Rd) to the inactive position and the jogger (11) is retracted, its striking face (13) fully inclined.

In a variant for adjusting the squaring-up device (1), the operator can feed longer blanks, because the slide (18) has a length which can be adjusted to suit the length of the folded blanks. For this purpose, a telescopic part (22) enters (arrow I in FIG. 2) the main body of the slide (18) and passes out (arrow 0 in FIG. 2) of the main body of the slide (18). This telescopic part (22) enables the length of the slide (18) and its upper surface (21) to be increased at will, allowing the jogger (11) to be kept in the squaring-up position for a longer distance.

To pivot (Ru and Rd) the jogger (11), the squaring-up device (1) also includes control means (23) for controlling the effector means (17). The control means (23) will thus serve for raising (U) and lowering (D) the slide (18).

The control means (23) preferably comprise at least one actuator (24) and at least one mechanism (26) for moving (D and U) the slide (18) from the high advanced position to the low withdrawn position and vice versa from this low withdrawn position to this high advanced position. The actuator (24) is directly connected to the slide (18). When the actuator (24) rises (arrow T in FIG. 2), the slide (18) is pushed upwards (U), and when the actuator (24) descends (arrow L in FIG. 3), the slide (18) is drawn down (D).

The actuator (24) is operated at will by the operator of the squaring-up device (1), and it is therefore possible to select and quickly retract any of the joggers (11). The actuator (24) is also operated if a jam is detected by an appropriate sensor, so that all joggers (11) can be retracted automatically and quickly.

To ensure that the slide (18) remains exactly horizontal, both when raised and when lowered, and in order that the slide (18) rises and goes down with a vertical movement (D and U), the mechanism (26) is advantageously a deformable parallelogram. One of the sides of this parallelogram, the top horizontal side, is formed by the slide (18) or one of its lower component parts. The two short lateral sides (27) of the deformable parallelogram are connected so as to pivot relative to the frame (2). A lower bar (28) closes the deformable parallelogram.

In one very effective embodiment allowing the switch to skip-feed mode, the squaring-up device (1) comprises at least two joggers (29 and 31) which are connected to the chain (3). The effector means (17) thus comprise first of all at least two rollers (32 and 33), each mounted on a jogger (29 and 31).

Figure 6:
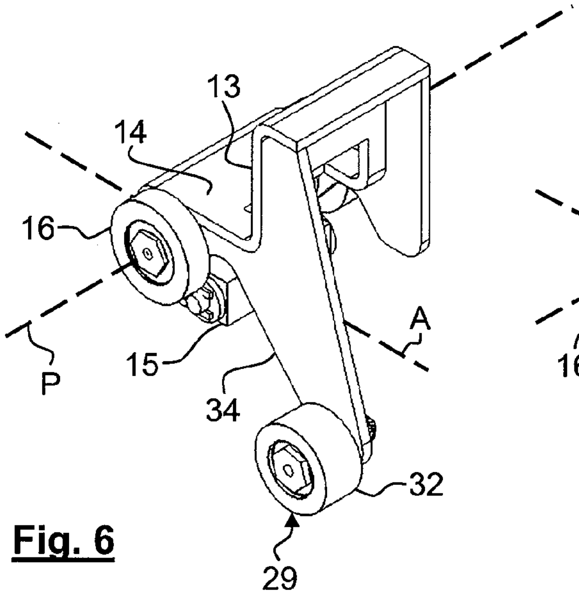
FIG. 6 is a perspective view of a first embodiment of a jogger.
Figure 7:
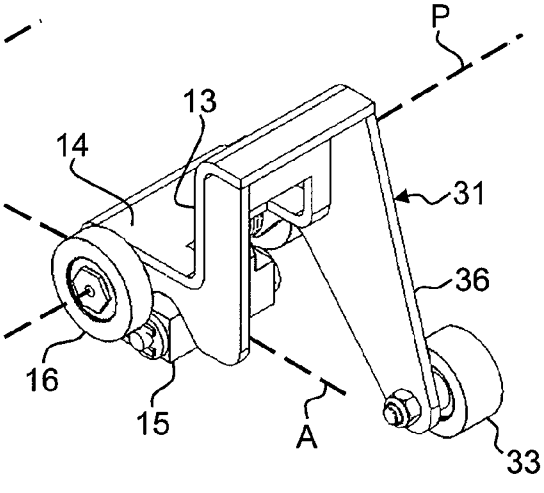
FIG. 7 is a perspective view of a second embodiment of a jogger.

As can be seen in FIGS. 6 and 7, the two joggers (29 and 31) exist in two embodiments. The joggers (29 and 31) are different and have mirror symmetry with respect to each other. Thus, on one of the joggers (29), the wheel on the left (32) is positioned at the end of a left-hand leg (34), while on the other jogger (31) the wheel on the right (33) is positioned at the end of a right-hand leg (36).

Next, the effector means (17) also include two slides (18). The two slides (18) are situated on either side, that is to say one on the right and the other on the left, of the longitudinal axis of the drive means (A). The right-hand and left-hand slides (18) comprise right-hand and left-hand control means (23), respectively, with a right-hand actuator and a left-hand actuator (24) and a right-hand mechanism and a left-hand mechanism (26).

The left-hand jogger (29), the left-hand wheel (32), the left-hand leg (34), the left-hand slide (18), the left-hand control means (23), the left-hand actuator (24), and the left-hand mechanism (26), on the one hand; and the left-hand jogger (31), the right-hand wheel (33), the right-hand leg (36), the right-hand slide (18), the right-hand control means (23), the right-hand actuator (24) and the right-hand mechanism (26), on the other, are defined as the jogger (29), the wheel (32), the leg (34), the slide (18), the control means (23), the actuator (24), and the mechanism (26) situated on the operator's side, and the jogger (31), the wheel (33), the leg (36), the slide (18), the control means (23), the actuator (24), and the mechanism (26) situated on the non-operator side. Alternatively, all these left-hand and right-hand elements are defined when the squaring-up device (1) is viewed in the direction (F) of longitudinal advance or along the longitudinal axis (A) of the chain (3).

Each of these two rollers—the left-hand wheel (32) and the right-hand wheel (33), is able to interact with one of the two slides (18), respectively the left-hand slide and the right-hand slide, which are immediately adjacent.

In the squaring-up device (1) and along the chain (3), left-hand joggers (29) with a left-hand wheel (32) on one side of the chain (3) alternate with right-hand joggers (31) with a right-hand wheel (33) on the other side of the chain (3).

The left-hand and right-hand actuators (24) are operated (L and T) as and when desired by the operator of the squaring-up device (1), which means that the left-hand and right-hand slides (18) can be lowered (D) and raised (U) to quickly retract the selected left-hand joggers (29) and right-hand joggers (31). Since the left-hand joggers (29) alternate, as described earlier, with the right-hand joggers (31), the operator can switch easily from normal mode, in which the left-hand joggers (29) and right-hand joggers (31) are in the active squaring-up position, to skip-feed mode, in which the left-hand joggers (29) or right-hand joggers (31) are in the active squaring-up position and the right-hand joggers (31) or left-hand joggers (29) are in the inactive retracted position.

The present invention is not limited to the embodiments described and illustrated. Numerous modifications can be made without thereby departing from the scope defined by the set of claims.

The invention claimed is:

1. A squaring-up device for a package converting line, to be located between a blank folding section and a folded-blank assembly section, the squaring-up device comprising:

a frame, at least one jogger including a striking face, the at least one jogger having a deployed active position in which the striking face strikes a folded blank to square-up and correct a geometry of the folded blank and having a retracted inactive position, a drive connected with and driving the at least one jogger and configured and operable for transporting the at least one jogger along a path of longitudinal advance of the blank, an effector for moving the at least one jogger from the active position to a retracted inactive position, and vice versa, the effector comprising, a slide mounted on the frame and extending along the path of advance of the blank, the slide being movable between an advanced position and a withdrawn position, and vice versa, and a slider mounted on the jogger and configured to interact with the slide such that the jogger is moved from the active position, when the slide is in the advanced position, to the inactive position, when the slide is in the withdrawn position, and vice versa, a control for the effector.

2. The squaring-up device according to claim 1, further comprising a pivot axis of the jogger configured to enable the jogger to rotate with respect to the drive from the deployed active position to the retracted inactive position, and vice versa.

3. The device according to claim 2, wherein the pivot axis of the jogger is essentially perpendicular to the direction of longitudinal advance of the blanks or to a longitudinal axis of the drive and the pivot axis is located in a plane coinciding with or essentially parallel to the plane of advance of the blanks.

4. The device according to claim 1, wherein the jogger is mounted centrally with respect to the drive such that the central longitudinal plane of the jogger coincides essentially with the longitudinal axis of the drive.

5. The device according to claim 1, further comprising at least two of the joggers mounted on the drive, and the effector comprises a respective one of the slides for each of the joggers, a respective one of the sliders mounted on each jogger, each slider being configured to interact with an immediately adjacent one of the slides to move the slider and the respective jogger between the advanced and inactive positions.

6. The device according to claim 5, further comprising two of the slides located on either side of the longitudinal axis of the drive, and first joggers having their respective slider located on one side of the drive alternate with second joggers having their respective slider located on the other side of the drive.

7. The device according to claim 1, wherein the control comprises at least one actuator for a mechanism and a mechanism actuated by the actuator for moving the slide from the advanced position to the withdrawn position, and vice versa.

8. The device according to claim 7, wherein the mechanism includes a deformable parallelogram, including one side formed by the slide.

9. The device according to claim 1, wherein the slide has a length along the path of longitudinal advance which is adjustable corresponding to a length of the folded blank.

10. The device according to claim 1, wherein the slide comprises a longitudinal ramp parallel to the longitudinal axis of the drive.

11. The device according to claim 1, wherein the jogger comprises two stabilizer rollers rolling in a trough and the slider includes a wheel which rolls and which bears on the slide.

12. A squaring-up device for a package converting line, to be located between a blank folding section and a folded-blank assembly section, the squaring-up device comprising:

a frame, at least one jogger including a striking face, the at least one jogger having a deployed active position in which the striking face strikes a folded blank for squaring-up and correcting a geometry of the folded blank and having a retracted inactive position, a drive connected with and driving the at least one jogger and configured and operable for transporting the at least one jogger along a path of longitudinal advance of the blank, an effector for moving the at least one jogger from the active position to a retracted inactive position, and vice versa, and a control for the effector wherein the effector comprises:

a slide mounted on the frame and extending along the path of advance of the blank, the slide being movable between an advanced position and a withdrawn position, and vice versa, and a slider mounted on the jogger and configured to interact with the slide such that the jogger is moved from the active position, when the slide is in the advanced position, to the inactive position, when the slide is in the withdrawn position, and vice versa, wherein the control comprises at least one actuator for a mechanism and a mechanism actuated by the actuator for moving the slide from the advanced position to the withdrawn position, and vice versa, and wherein the mechanism includes a deformable parallelogram, including one side formed by the slide.

13. A squaring-up device for a package converting line, to be located between a blank folding section and a folded-blank assembly section, the squaring-up device comprising:

a frame, at least one jogger including a striking face, the at least one jogger having a deployed active position in which the striking face strikes a folded blank for squaring-up and correcting a geometry of the folded blank and having a retracted inactive position, a drive connected with and driving the at least one jogger and configured and operable for transporting the at least one jogger along a path of longitudinal advance of the blank, an effector for moving the at least one jogger from the active position to a retracted inactive position, and vice versa, and a control for the effector wherein the effector comprises:

a slide mounted on the frame and extending along the path of advance of the blank, the slide being movable between an advanced position and a withdrawn position, and vice versa, and a slider mounted on the jogger and configured to interact with the slide such that the jogger is moved from the active position, when the slide is in the advanced position, to the inactive position, when the slide is in the withdrawn position, and vice versa, and wherein the jogger comprises two stabilizer rollers rolling in a trough and the slider includes a wheel which rolls and which bears on the slide.

* * * * *